(12) United States Patent
Davis

(10) Patent No.: US 6,371,633 B1
(45) Date of Patent: Apr. 16, 2002

(54) SNOWPLOW BLADE SAFETY LIGHT ASSEMBLY ATTACHMENT

(76) Inventor: Stephen C. Davis, P.O. Box #16, Strafford, NH (US) 03884

( * ) Notice: Subject to any disclaimer, the term of this patent is extended or adjusted under 35 U.S.C. 154(b) by 41 days.

(21) Appl. No.: 09/641,849

(22) Filed: Aug. 18, 2000

(51) Int. Cl.[7] .................................................. B60Q 1/26
(52) U.S. Cl. ........................ 362/459; 362/540; 362/370
(58) Field of Search ................................ 362/485, 487, 362/540, 543, 549, 370, 432, 473, 253, 459

(56) References Cited

U.S. PATENT DOCUMENTS

| | | | |
|---|---|---|---|
| 1,291,625 A | * | 1/1919 | Palmer ........................ 362/540 |
| 3,683,842 A | * | 8/1972 | Logan ........................ 362/485 |
| 4,054,302 A | | 10/1977 | Campbell |
| 4,277,818 A | | 7/1981 | Urbanek et al. |
| 4,628,415 A | | 12/1986 | Vescio et al. |
| 4,692,850 A | * | 9/1987 | LeDoux ...................... 362/432 |
| D328,146 S | | 7/1992 | Sinsteden |
| 5,521,803 A | | 5/1996 | Eckert et al. |
| 5,778,567 A | | 7/1998 | Jager et al. |

* cited by examiner

*Primary Examiner*—Y. My Quach-Lee

(57) ABSTRACT

A snowplow blade safety light assembly attachment for providing highly visible lighting on snowplow blades. The snowplow blade safety light assembly attachment includes a fastening assembly being adapted to securely attach to a top edge of a snowplow blade; and also includes an elongate flexible support member being securely mounted to the fastening assembly; and further includes a protective member being securely mounted upon the fastening assembly for shielding a lower portion of the elongate flexible support member; and also includes a light-emitting assembly securely mounted to the elongate flexible support member and being adapted to connect to a power source of a prime mover.

12 Claims, 4 Drawing Sheets

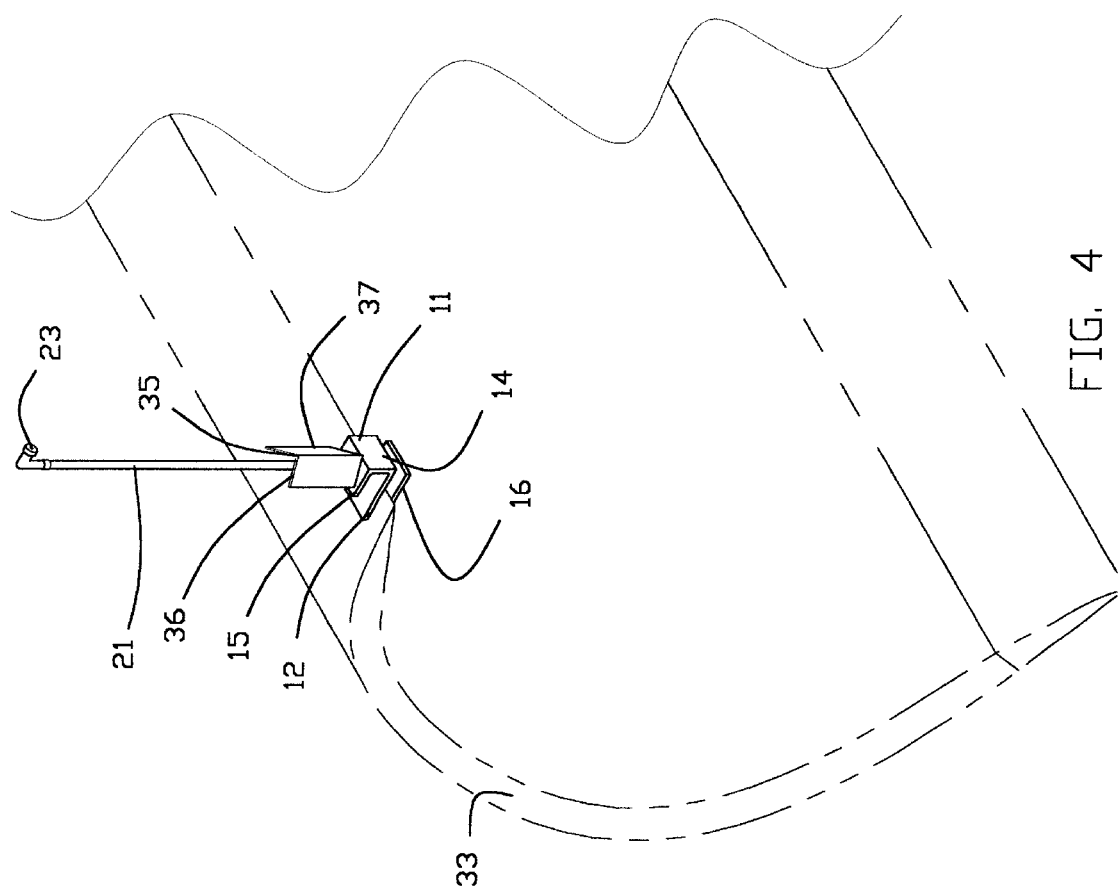

SNOWPLOW BLADE SAFETY LIGHT ASSEMBLY ATTACHMENT

BACKGROUND OF THE INVENTION

1. Field of the Invention

The present invention relates to a light assembly attachment for snowplows and more particularly pertains to a new snowplow blade safety light assembly attachment for providing highly visible lighting on snowplow blades.

2. Description of the Prior Art

The use of a light assembly attachment for snowplows is known in the prior art. More specifically, a light assembly attachment for snowplows heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 4,277,818; 5,778,567; 4,054,302; 4,628,415; 5,521,803; and U.S. Pat. No. Des. 328,146.

While these devices fulfill their respective, particular objectives and requirements, the aforementioned patents do not disclose a new snowplow blade safety light assembly attachment. The inventive device includes a fastening assembly being adapted to securely attach to a top edge of a snowplow blade; and also includes an elongate flexible support member being securely mounted to the fastening assembly; and further includes a protective member being securely mounted upon the fastening assembly for shielding a lower portion of the elongate flexible support member; and also includes a light-emitting assembly securely mounted to the elongate flexible support member and being adapted to connect to a power source of a prime mover.

In these respects, the snowplow blade safety light assembly attachment according to the present invention substantially departs from the conventional concepts and designs of the prior art, and in so doing provides an apparatus primarily developed for the purpose of providing highly visible lighting on snowplow blades.

SUMMARY OF THE INVENTION

In view of the foregoing disadvantages inherent in the known types of light assembly attachment for snowplows now present in the prior art, the present invention provides a new snowplow blade safety light assembly attachment construction wherein the same can be utilized for providing highly visible lighting on snowplow blades.

The general purpose of the present invention, which will be described subsequently in greater detail, is to provide a new snowplow blade safety light assembly attachment which has many of the advantages of the light assembly attachment for snowplows mentioned heretofore and many novel features that result in a new snowplow blade safety light assembly attachment which is not anticipated, rendered obvious, suggested, or even implied by any of the prior art light assembly attachment for snowplows, either alone or in any combination thereof.

To attain this, the present invention generally comprises a fastening assembly being adapted to securely attach to a top edge of a snowplow blade; and also includes an elongate flexible support member being securely mounted to the fastening assembly; and further includes a protective member being securely mounted upon the fastening assembly for shielding a lower portion of the elongate flexible support member; and also includes a light-emitting assembly securely mounted to the elongate flexible support member and being adapted to connect to a power source of a prime mover.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new snowplow blade safety light assembly attachment which has many of the advantages of the light assembly attachment for snowplows mentioned heretofore and many novel features that result in a new snowplow blade safety light assembly attachment which is not anticipated, rendered obvious, suggested, or even implied by any of the prior art light assembly attachment for snowplows, either alone or in any combination thereof.

It is another object of the present invention to provide a new snowplow blade safety light assembly attachment which may be easily and efficiently manufactured and marketed.

It is a further object of the present invention to provide a new snowplow blade safety light assembly attachment which is of a durable and reliable construction.

An even further object of the present invention is to provide a new snowplow blade safety light assembly attachment which is susceptible of a low cost of manufacture with regard to both materials and labor, and which accordingly is then susceptible of low prices of sale to the consuming public, thereby making such snowplow blade safety light assembly attachment economically available to the buying public.

Still yet another object of the present invention is to provide a new snowplow blade safety light assembly attachment which provides in the apparatuses and methods of the prior art some of the advantages thereof, while simultaneously overcoming some of the disadvantages normally associated therewith.

Still another object of the present invention is to provide a new snowplow blade safety light assembly attachment for providing highly visible lighting on snowplow blades.

Yet another object of the present invention is to provide a new snowplow blade safety light assembly attachment which includes a fastening assembly being adapted to securely attach to a top edge of a snowplow blade; and also includes an elongate flexible support member being securely mounted to the fastening assembly; and further includes a protective member being securely mounted upon the fastening assembly for shielding a lower portion of the elongate flexible support member; and also includes a light-emitting assembly securely mounted to the elongate flexible support member and being adapted to connect to a power source of a prime mover.

Still yet another object of the present invention is to provide a new snowplow blade safety light assembly attachment that increases safety on the roads when snowplows are present because other motorists are able to better see the snowplows.

Even still another object of the present invention is to provide a new snowplow blade safety light assembly attachment that is easy and convenient to detachably attach to the snowplow blades of a prime mover.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 is a perspective view of another embodiment of the present invention.

DESCRIPTION OF THE PREFERRED EMBODIMENT

Figure 1:
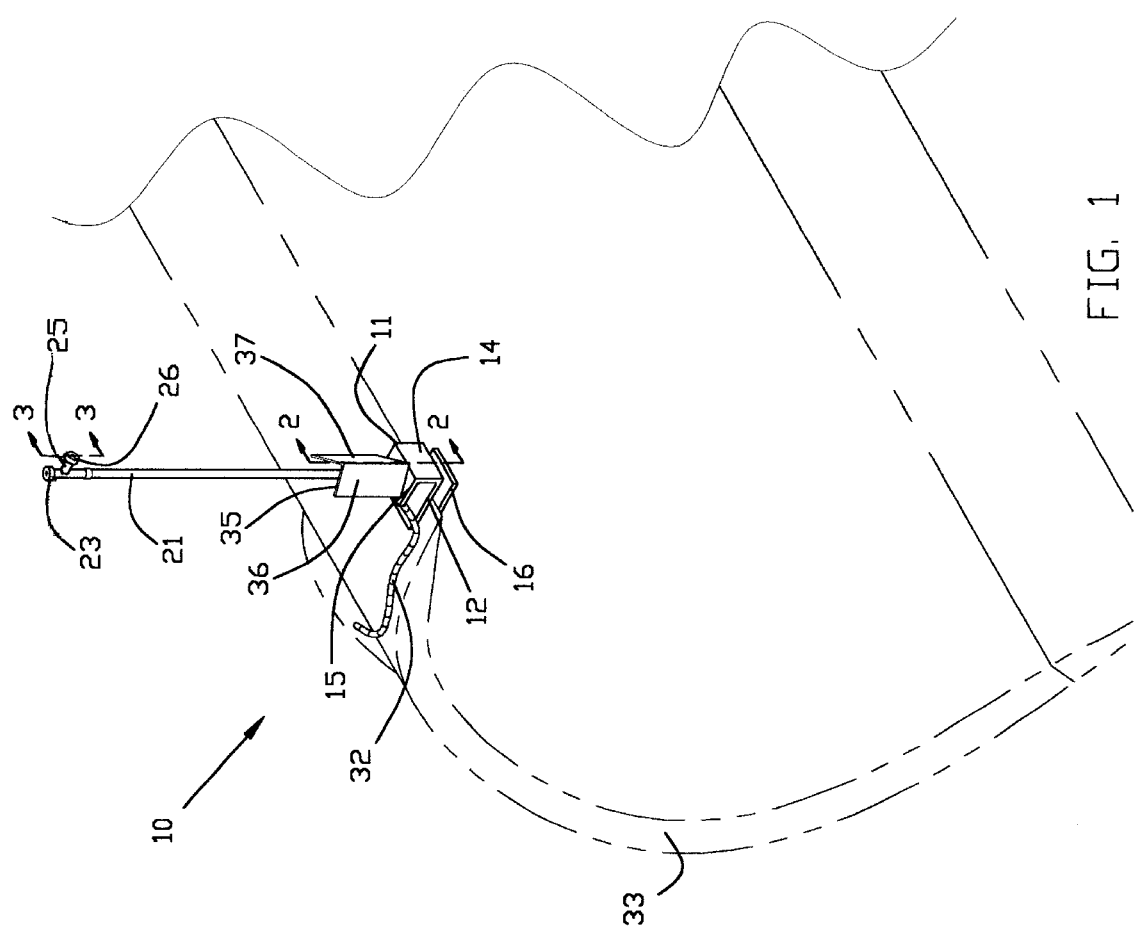
FIG. 1 is a perspective view of a new snowplow blade safety light assembly attachment according to the present invention and being shown in use.
Figure 2:
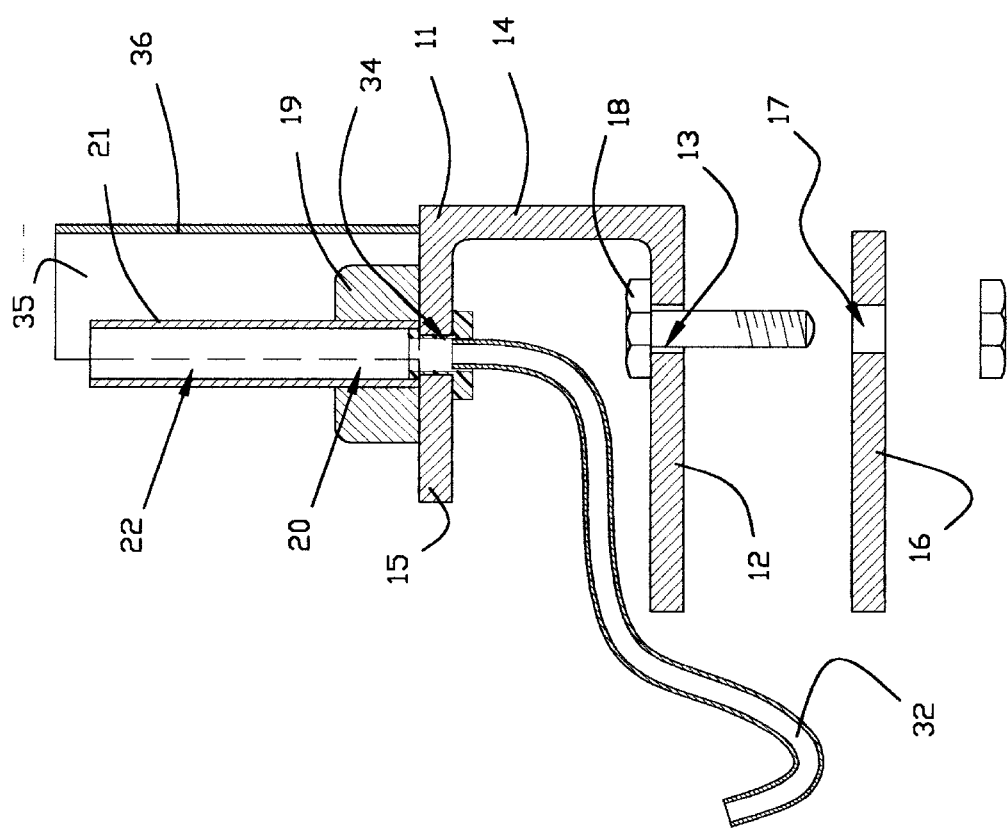
FIG. 2 is a cross-sectional view of fastening assembly and of the lower portion of the elongate flexible support member and of the protective member of the present invention.
Figure 3:
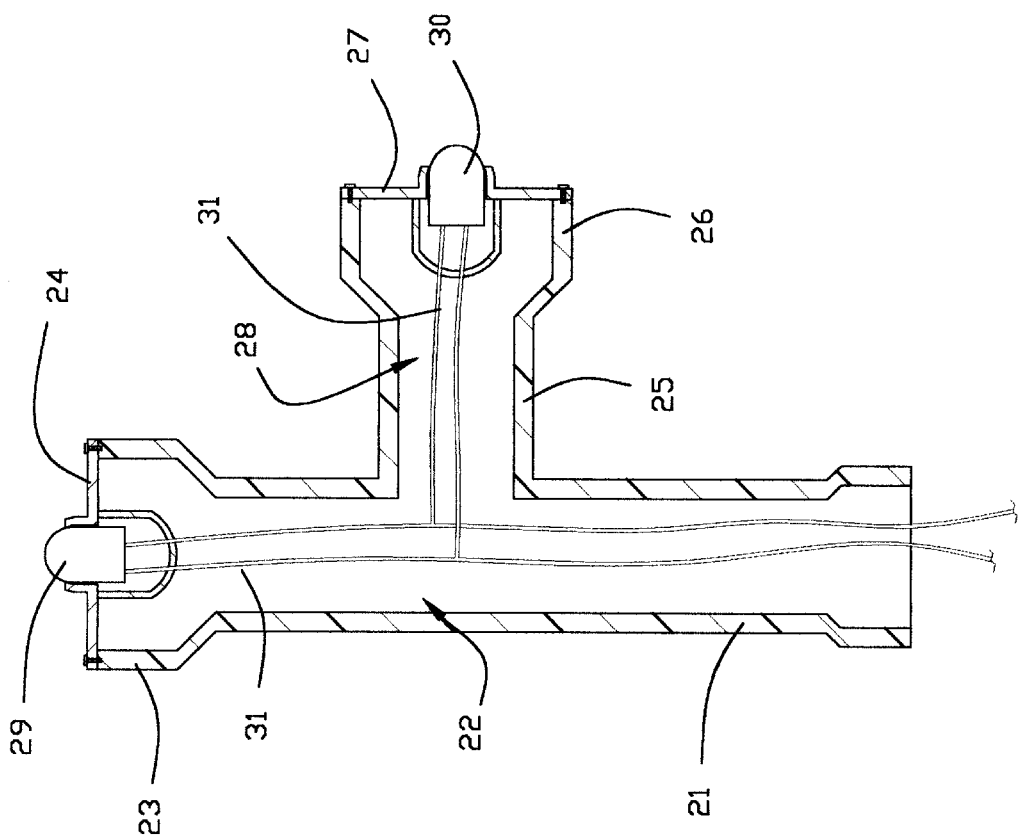
FIG. 3 is a cross-sectional view of the upper portion of the elongate flexible support member and of the light-emitting members of the present invention.

With reference now to the drawings, and in particular to FIGS. 1 through 4 thereof, a new snowplow blade safety light assembly attachment embodying the principles and concepts of the present invention and generally designated by the reference numeral 10 will be described.

As best illustrated in FIGS. 1 through 4, the snowplow blade safety light assembly attachment 10 generally comprises a fastening assembly 11–20 being adapted to securely attach to a top edge of a snowplow blade 33. The fastening assembly 11–20 includes a bracket member 11 being adapted to fastenably mount upon a side of the snowplow blade 33, and also includes a bracket mounting member 16 having a hole 17 disposed therethrough and being adapted to be fastenable and engageable to an opposite side of the snowplow blade 33, and further includes a fastening member 18 for securely fastening the bracket member 11 and the bracket mounting member 16 about the sides of the top edge of the snowplow blade 33. The bracket member 11 includes a base portion 12 having a hole 13 disposed therethrough, and also includes an intermediate portion 14 which is integrally attached to an end of the base portion 12 and which is angled relative to the base portion 12, and further includes an end portion 15 which is integrally attached to a top end of the intermediate portion 14 and which is angled relative to the intermediate portion 14. The end portion 15 of the bracket member 11 is spaced above and disposed parallel to the base portion 12 and has a hole 34 disposed therethrough. The fastening assembly 11–20 further includes a boss-like support member 19 being securely and conventionally attached upon a top surface of the end portion 15 of the bracket member 11 and having a bore 20 extending therethrough from a top to a bottom thereof with the bore 20 being in alignment with the hole 34 through the end portion 15 of the bracket member An elongate flexible support member 21 is securely mounted to the fastening assembly 11–20 with the elongate flexible support member 21 being essentially a tubular member having a bore 22 extending therethrough. The lower portion of the elongate flexible support member 21 being securely engaged in the bore 20 of the boss-like support member 19 with the elongate flexible support member 21 extending outwardly and upwardly therefrom. As a first embodiment, the elongate flexible support member 21 has an enlarged top end portion 23 and includes an offshoot portion 25 integrally extending outwardly from the elongate flexible support member 21 near a top end 24 thereof and being adapted to be extended forward relative to the snowplow blade 33. The offshoot portion 25 has a bore 28 extending therethrough and is continuous with the bore 22 of the elongate flexible support member 21 and further has an enlarged outer end portion 26.

A protective member 35 is securely and conventionally mounted and welded upon the fastening assembly 11–20 for shielding a lower portion of the elongate flexible support member 21. The protective member 35 is essentially a plate-like deflective member having a first portion 36 and a second portion 37 which is angled relative to the first portion 36 with the protective member 35 being securely disposed on edge upon the top surface of the end portion 15 of the bracket member 11.

A light-emitting assembly 29–32 is securely and conventionally mounted to the elongate flexible support member 21 and is adapted to connect to a power source of a prime mover. As a first embodiment, the light-emitting assembly 29–32 includes light-emitting members 29,30 being securely disposed in the enlarged top end portion 23 and extended from the top end 24 of the elongate flexible support member 21 and also being securely disposed in the enlarged outer end portion 26 and extended from an outer end 27 of the offshoot portion 25, and also includes wires 31 connected to the light-emitting members 29,30 and being disposed in the bores 22,28 of the elongate flexible support member 21 and the offshoot portion 25, and further includes a power cord 32 being securely attached to the wires 31 and being adapted to connect to the power source of the prime mover.

As a second embodiment, the elongate flexible support member 21 includes an enlarged top end portion 23 which is angled relative to a main portion of the elongate flexible support member 21 and which is adapted to extend forward relative to the snowplow blade 33 with a light-emitting member 29 being securely disposed in the enlarged top end portion 23 and extending outwardly of the top end 24 of the elongate flexible support member 21.

In use, the user would clamp the bracket member 11 and the bracket mounting member 16 to the top edge of a snowplow blade 33 and direct the light-emitting member 30 in the offshoot portion 25 forward and would then attach the power cord 32 to the battery of the prime mover to essentially energize the light-emitting members 29,30 so that the snowplow blade 33 becomes highly visible to other motorists.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A snowplow blade safety light assembly attachment comprising:
   a fastening assembly securely attached to a top edge of a snowplow blade;
   an elongate flexible support member being securely mounted to said fastening assembly;
   a protective member securely mounted upon said fastening assembly for shielding a lower portion of said elongate flexible support member; and
   a light-emitting assembly securely mounted to said elongate flexible support member and being adapted to connect to a power source of a prime mover.

2. A snowplow blade safety light assembly attachment as described in claim 1, wherein said fastening assembly includes a bracket member being adapted to fastenably mount upon a side of the snowplow blade, and also includes a bracket mounting member having a hole disposed therethrough and being adapted to fasten and engage to an opposite side of the snowplow blade, and further includes a fastening member for securely fastening said bracket member and said bracket mounting member about the sides of the top edge of the snowplow blade.

3. A snowplow blade safety light assembly attachment as described in claim 2, wherein said bracket member includes a base portion having a hole disposed therethrough, and also includes an intermediate portion which is integrally attached to an end of said base portion and which is angled relative to said base portion, and further includes an end portion which is integrally attached to a top end of said intermediate portion and which is angled relative to said intermediate portion.

4. A snowplow blade safety light assembly attachment as described in claim 3, wherein said end portion of said bracket member is spaced above and disposed parallel to said base portion and has a hole disposed therethrough.

5. A snowplow blade safety light assembly attachment as described in claim 4, wherein said fastening assembly further includes a boss-like support member being securely attached upon a top surface of said end portion of said bracket member and having a bore extending therethrough from a top to a bottom thereof, said bore being in alignment with said hole through said end portion of said bracket member.

6. A snowplow blade safety light assembly attachment as described in claim 5, wherein said protective member is essentially a plate-like deflective member having a first portion and a second portion which is angled relative to said first portion, said protective member being securely disposed on edge upon said top surface of said end portion of said bracket member.

7. A snowplow blade safety light assembly attachment as described in claim 6, wherein said elongate flexible support member is essentially a tubular member having a bore extending therethrough, said lower portion of said elongate flexible support member being securely engaged in said bore of said boss-like support member with said elongate flexible support member extending outwardly and upwardly therefrom.

8. A snowplow blade safety light assembly attachment as described in claim 7, wherein said elongate flexible support member has an enlarged top end portion and includes an offshoot portion extending outwardly from said elongate flexible support member near a top end thereof and being adapted to be extended forward relative to said snowplow blade, said offshoot portion having a bore extending therethrough and being continuous with said bore of said elongate flexible support member and further having an enlarged outer end portion.

9. A snowplow blade safety light assembly attachment as described in claim 8, wherein said light-emitting assembly includes light-emitting members being securely disposed in said enlarged top end portion and extended from said top end of said elongate flexible support member and being securely disposed in said enlarged outer end portion and extended from an outer end of said offshoot portion, and also includes wires connected to said light-emitting members and being disposed in said bores of said elongate flexible support member and said offshoot portion, and further includes a power cord being securely attached to said wires and being adapted to connect to the power source of the prime mover.

10. A snowplow blade safety light assembly attachment as described in claim 7, wherein said elongate flexible support member includes an enlarged top end portion which is angled relative to a main portion of said elongate flexible support member and which is adapted to extend forward relative to the snowplow blade.

11. A snowplow blade safety light assembly attachment as described in claim 10, wherein said light-emitting assembly includes a light-emitting member securely disposed in said enlarged top end portion and extending outwardly of a top end of said elongate flexible support member.

12. A snowplow blade safety light assembly attachment comprising:
   a fastening assembly securely attach to a top edge of a snowplow blade, said fastening assembly including a bracket member being adapted to fastenably mount upon a side of the snowplow blade, and also including a bracket mounting member having a hole disposed therethrough and being adapted to fasten and engage to an opposite side of the snowplow blade, and further including a fastening member for securely fastening said bracket member and said bracket mounting member about the sides of the top edge of the snowplow blade, said bracket member including a base portion having a hole disposed therethrough, and also including an intermediate portion which is integrally attached to an end of said base portion and which is angled relative to said base portion, and further including an end portion which is integrally attached to a top end of said intermediate portion and which is angled relative to said intermediate portion, said end portion of said bracket member being spaced above and disposed parallel to said base portion and has a hole disposed therethrough, said fastening assembly further including a boss-like support member being securely attached upon a top surface of said end portion of said bracket member and having a bore extending therethrough from a top to a bottom thereof, said bore being in alignment with said hole through said end portion of said bracket member;

an elongate flexible support member securely mounted to said fastening assembly, said elongate flexible support member being essentially a tubular member having a bore extending therethrough, a lower portion of said elongate flexible support member being securely engaged in said bore of said boss-like support member with said elongate flexible support member extending outwardly and upwardly therefrom, said elongate flexible support member having an enlarged top end portion and including an offshoot portion extending outwardly from said elongate flexible support member near a top end thereof and being adapted to be extended forward relative to said snowplow blade, said offshoot portion having a bore extending therethrough and being continuous with said bore of said elongate flexible support member and further having an enlarged outer end portion;

a protective member securely mounted upon said fastening assembly for shielding said lower portion of said elongate flexible support member, said protective member being essentially a plate-like deflective member having a first portion and a second portion which is angled relative to said first portion, said protective member being securely disposed on edge upon said top surface of said end portion of said bracket member; and a light-emitting assembly securely mounted to said elongate flexible support member and being adapted to connect to a power source of a prime mover, said light-emitting assembly including light-emitting members being securely disposed in said enlarged top end portion and extended from said top end of said elongate flexible support member and being securely disposed in said enlarged outer end portion and extended from an outer end of said offshoot portion, and also including wires connected to said light-emitting members and being disposed in said bores of said elongate flexible support member and said offshoot portion, and further including a power cord being securely attached to said wires and being adapted to connect to the power source of the prime mover.

\* \* \* \* \*